C. KESSES.
MOVING PICTURE CAMERA.
APPLICATION FILED OCT. 28, 1914.
1,223,341.
Patented Apr. 17, 1917.
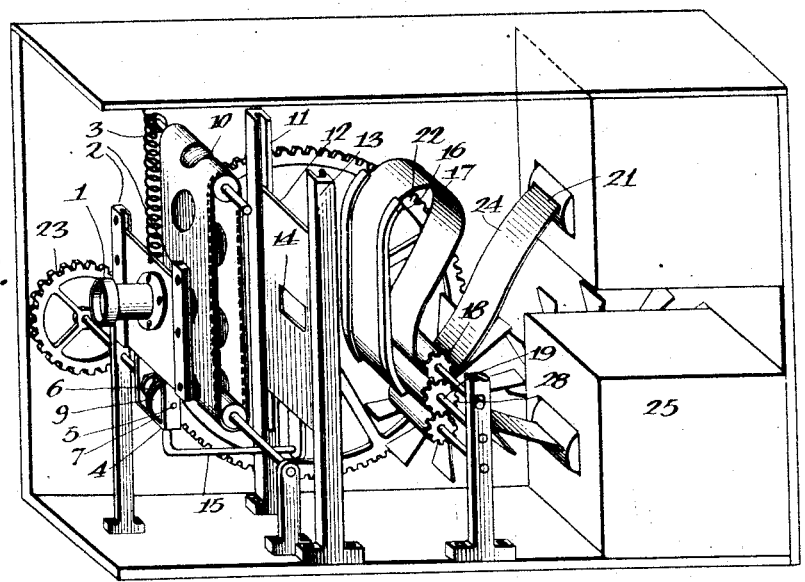
Fig. 1.
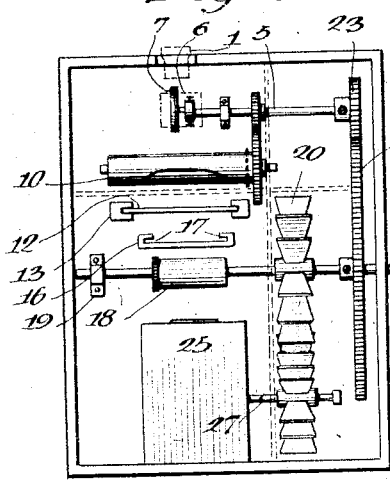
Fig. 2.
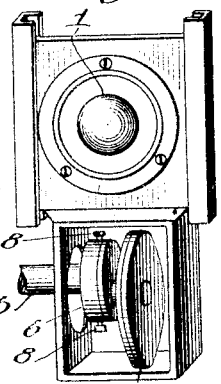
Fig. 3.
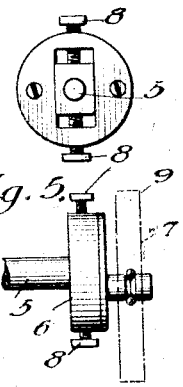
Fig. 4.
Fig. 5.
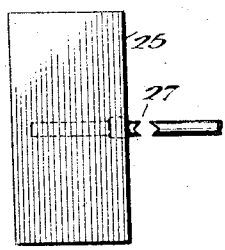
Fig. 9.
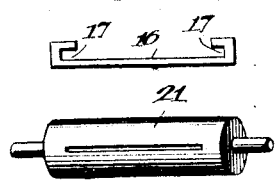
Fig. 6.
Fig. 7.
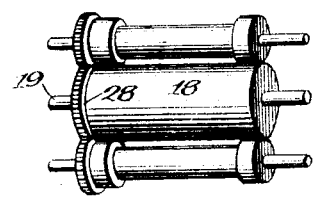
Fig. 8.
Inventor:
Charles Kesses.

UNITED STATES PATENT OFFICE.

CHARLES KESSES, OF NEW YORK, N. Y.

MOVING-PICTURE CAMERA.

1,223,341.  Specification of Letters Patent.  Patented Apr. 17, 1917.

Application filed October 28, 1914.  Serial No. 869,113.

*To all whom it may concern:*

Be it known that I, CHARLES KESSES, a citizen of the United States, and a resident of New York city, in the county of New York and State of New York, have invented a new and useful Moving-Picture Camera, of which the following is a specification.

My invention relates to improvements in moving picture cameras.

It has long been common to pull and release film for each exposure, with hooks or other mechanism, but since there are 12 to 18 and more pictures per second necessary to produce good results, this quick movement puts a terrible strain on the film and mechanism; also a sensitive film in such quick speed, passing between two steel plates, having pressure of springs, to prevent film from sliding by exposure, will produce if the camera is in operation for sometime, electrical markings on the pictures.

I overcome this in my invention, by photographing on independent, constantly running film.

This camera does away with expensive perforating of film and feeds the film by means of rollers.

This camera is provided with an independent lens movement and a separated moving exposing slide; parts being as light and small as possible to reduce vibration in the camera.

A mechanical movement, consisting of an eccentric wheel and regulator lifts and lowers a lens in a plane and this movement can be regulated and set to the quickness required.

Suitable means are provided to hold a film on all sides steady and smooth in the rear of the lens, where pictures are taken on the film.

I attain these objects by the mechanism illustrated in the accompanying drawings in which, Figure I is a perspective view of the camera.

Fig. II is a top view of the mechanism.

Fig. III is the sliding lens with eccentric wheel.

Fig. IV is the side view of the regulator.

Fig. V is the eccentric wheel.

Fig. VI is the top inlet for the film support.

Fig. VII is the turnable inlet for the film boxes.

Fig. VIII is the film transporting rollers.

Fig. IX is the fork connection on the paddle wheel and on the film boxes.

Similar letters refer to similar parts throughout the several views.

Fig. III: 1 a lens in a 2x2 inch, aluminum lens board running on rails 2 up and down; a spring 3 is just strong enough to lift lens to top of rails, said spring is fastened to the lens board and top of the camera. A square frame 4 is mounted on the lens board; said frame has openings on the sides allowing the passing of the front driving shaft 5.

Fig. IV: 6 is a regulator, center of said regulator has a square sliding part mounted solidly to the front driving shaft 5.

Fig. V: 7 is an eccentric wheel, which is mounted on a base to said regulator, the screws 8 on said regulator will regulate to move said eccentric wheel one or the other way. If the size of pictures are ¾ of an inch high, then the eccentric wheel has to be set with said regulator to lower and lift the lens each way ⅜ of an inch, both movements combined have to be ¾ of an inch, to have perfect harmony in lens and film movement, a rim 9 running in ball bearings around said eccentric wheel; said rim is a trifle smaller than the frame 4 to allow movement of said rim, in said frame.

Fig. I: A curtain shutter 10 works over two rollers in one direction; bottom roller is operatively connected to front shaft 5; said shutter has corresponding openings 11, to allow exposing, when the lens moves downward; said roller has pins to lift in corresponding holes on both sides of the curtain; said curtain is divided in an even number of opened and closed parts; the curtain is made from black rubberized linen. Diameter of the bottom roller has to be large enough to transport by each exposure, one open and one closed part of said curtain.

Fig. I: 12 is a movable exposing slide, consisting of a hard rubber board; said exposing slide is provided on both sides with rails 13 and has a center opening 14 size of picture to be taken; it prints a white margin around pictures.

Fig I: 15 is a pin mounted on frame 4; said pin runs in an opening in the exposing slide to lift and lower said slide for every exposure.

Figs. I and VI: 16 is a stationary film support having a small groove 17 on each side; said grooves running all the way down to guide the film down and keep said film which is to be exposed while running over said support in good position.

Fig. VIII: 18 is a transporter of film consisting of three rollers having a cogwheel connection 28, the top and bottom rollers are provided with springs 26 to press against center roller; said top and bottom rollers are curved a little on the inside to preserve the sensitive side of film; center roller is solid on driving shaft 19.

Fig. II: Two flexible paddle wheels 20 fastened solid on two shafts, to engage each other and rewind exposed film with variable speed; both wheels having celluloid leaves to pass each other if there is not enough exposed film.

Fig. VII: 21 is a turnable inlet for film in film boxes 25 to give film going in or out of boxes, if film spool is full or almost empty, the right position so that the film will not be bent; to exchange a film box, turn slot downward till said slot will not show and box will be light proof.

Camera is divided by a partition into two parts, shown on Fig. II, as a dotted line, running close behind the shutter and between paddle wheel and film.

Fig. IX: 27 is a fork on film spool and another fork on shaft of the flexible paddle wheel to wind up the film. Fastened solid on the operating shaft 19 is a center roller 18, a flexible paddle wheel 20 and gearwheel 22.

Center roller 18 has to be exactly the correct diameter to transport by each turn, film for 6 pictures.

Gearwheel 22 turns six times the gearwheel 23 mounted on front shaft 5, also the eccentric wheel and regulator mounted on same shaft; this will lift and lower the lens and the exposing slide six times.

From this it follows that by every turn of operating shaft, the roller 18 will rotate once furnishing film for 6 pictures; the lens and the exposing slide is also lifted and lowered 6 times; shutter is so proportioned as to be only open, when lens and exposing slide and constantly running film go down together in harmony.

*Operation of machine.*

Fasten a new film box in camera; move turnable inlet 21 for film forward; let film 24 run through top roller 18 down between grooves 17 in film support; again through bottom roller 18, and inlet on the bottom film box, to be fastened on the inside spool, have at least 3 inch extra film between top roller and film support, close outside door of camera and same is ready for operation.

I am aware that prior to my invention motion picture cameras have been made to pull and release film by every exposure; I therefore do not claim such a combination.

What I claim is:—

1. In a motion picture camera, the combination of a lens slide, a film guide way, means for feeding film continuously through said guide way, and exposing slide interposed between said lens slide and said film guide way, means for reciprocating said lens slide and said exposing slide in unison, means for adjusting the reciprocating means to cause the slides to move at the same speed as the film during exposure and a shutter to expose the film while the lens slide is moving in the same direction as the film.

2. In a motion picture camera, the combination of a lens slide, a film guide way, means for feeding film continuously through said guide way, an exposing slide interposed between said lens slide and said film guide way, means for reciprocating said lens slide and said exposing slide in unison, means for permitting the distance between said slides to be varied and a shutter to expose the film while the lens slide is moving in the same direction as the film.

3. In a motion picture camera, the combination of a lens slide, a film guide way, rollers adjacent said guide way to feed the film continuously therethrough, an exposing slide interposed between said lens slide and said film guide way, means for reciprocating said lens slide and said exposing slide in unison and a shutter to expose the film while the lens slide is moving in the same direction as the film.

CHARLES KESSES.

Witnesses:
  JOSEPH SPIRELLI,
  ANTONIO FERMI.